2

3,035,085
ESTERIFICATION OF CYANOGEN

Ken Matsuda, Stamford, and Kenneth Worden Saunders, Darien, Conn., assignors to American Cyanamid Company, New York, N.Y., a corporation of Maine
No Drawing. Filed May 18, 1960, Ser. No. 29,819
5 Claims. (Cl. 260—485)

The present invention relates to a novel and improved method for preparing aliphatic esters of cyanogen. More particularly, it relates to the esterification of cyanogen in an aqueous environment utilizing monohydric aliphatic alcohols to form aliphatic di-esters of oxalic acid in good yield and purity.

In the past, aliphatic di-esters of oxalic acid could be obtained. Unfortunately, they were obtained from cyanogen only in relatively poor yield. The best of the prior methods is disclosed in Liebig's Annalen, 158 at pages 118–122. It is there reported that the action of cyanogen on alcoholic hydrochloric acid results in the preparation of ethyl oxalate. The yield, however, is relatively low due to the formation of a number of products other than the oxalate. It has been estimated that the yield is in the neighborhood of about 5%. Since such a process does not lend itself to commercial exploitation, it is desirable to provide a process which is commercially feasible, particularly since such esters find utility in the synthesis of phenobarbital and other pharmaceuticals.

It is, therefore, a principal object of the present invention to provide an economical process for the preparation of oxalic acid di-esters in good yield. It is a further object to provide an improved process for providing oxalic acid di-esters in high yield and purity utilizing cyanogen in an aqueous environment. Other objects and advantages will become apparent from a consideration of the present disclosure.

Surprisingly, it has been found that the yields of aliphatic di-esters of oxalic acid esters can be markedly increased by the novel esterification of cyanogen with an aliphatic monohydric alcohol. According to the process of the invention, cyanogen and monohydric aliphatic alcohol is reacted in the presence of at least (a) one mol of hydrochloric acid or equivalents thereof and (b) one mol of water per mol of cyanogen. Unexpectedly, increased yields of 30% and higher of resultant di-esters are obtained.

The over-all reaction may be written as follows:

$(CN)_2 + 2ROH + 2HCl + 2H_2O \rightarrow (-COOR)_2 + 2NH_4Cl$ wherein R is an aliphatic radical, such as methyl, ethyl, propyl, butyl, octyl, allyl and the like.

In the above reaction, good results can also be obtained by replacing a portion of the water with an inert aromatic hydrocarbon solvent such as benzene or toluene. However, at least one mol of water should be present during reaction to obtain commercially attractive yields of oxalic acid di-ester. Usually, of from 1 to 3 mols of water per mol of cyanogen are required for optimum results.

The process of the invention will be illustrated utilizing ethyl alcohol and allyl alcohol as the representative "alcohol" reactants. Though hydrochloric acid is employed as the esterification catalyst, other mineral acids such as hydrobromic and sulfuric acids may be employed herein.

In general, the esterification reaction is carried out at room temperature or slightly above, say from about 35° C. to 75° C. When the reaction mixture becomes cloudy, reaction commences due to precipitation of solid impurities such as ammonium chloride. When precipitation ceases, the mixture is filtered and the filtrate then distilled to recover the desired oxalate di-ester.

It is an advantage of the present invention that as little as two mols of "alcohol" per mol of cyanogen are required to obtain excellent yields of di-ester. In prior processes, at least four mols of the "alcohol" (equivalent to an excess of 200% as employed in the instant process) were reacted with resultant low yield of oxalic acid di-ester.

In order to facilitate an understanding of the present invention, the following examples are presented as illustrative. They are not, however, to be taken as limitative thereof. Unless otherwise noted, the parts are by weight.

Example 1

To a suitable three-necked reaction vessel equipped with a refrigerated methanol-cooled condenser, stirrer, thermometer and gas inlet tube are added 395 parts of alcohol and 35 parts of water. The mixture is next cooled to about 10° C. and 99 parts of hydrochloric acid is introduced into the reaction vessel. While the reaction mixture is being stirred, 56 parts of cyanogen is slowly added at the rate of 0.02 mol/minute while permitting the temperature to rise to 35° C. After about one-half hour, the reaction mixture is filtered to remove a precipitate comprising essentially ammonium chloride. The filtrate is distilled at a temperature of 97° C. under vacuum of 10 mm. Hg to recover diethyl oxalate as a colorless liquid in 59% yields having a refractive index of $n_D^{20} = 1.4100$ and further identified by infrared.

Example 2

Repeating Example 1 above in every material respect except that water is omitted, a 5% yield of diethyl oxalate is obtained.

Example 3

To the suitable reaction vessel as described in Example 1 above is added 140 parts of alcohol, 27 parts of water and 100 parts of toluene. The mixture is next cooled to about 5° C. and 80 parts of hydrochloric acid is added thereto. To the agitated mixture is added slowly with agitation 57 parts of cyanogen at a rate of about 0.02 mol/minute, while permitting the temperature to rise to about 60° C. After the expiration of one-half hour, the reaction mixture is filtered to remove a precipitate comprising essentially ammonium chloride. The recovered filtrate is next distilled at 97° C. under subatmospheric pressure of 10 mm. Hg to recover diethyl oxalate as colorless liquid in 68% yields.

Example 4

The procedure of Example 3 above is repeated in every material detail except that 174 parts of allyl alcohol and 46 parts of cyanogen are added, respectively. Diallyl ester of oxalic acid identified by infrared is recovered in 30% yields as a colorless oil.

Although the diallyl and diethyl esters of oxalic acid have been exemplified, it is an advantage of the present invention to prepare other di-esters of oxalic acid such as the dimethyl, diamyl, dibutyl, dioctyl and the ethyl methyl esters, utilizing the principles herein disclosed.

We claim:

1. In an improved process for preparing the aliphatic di-esters of oxalic acid by reacting an aliphatic monohydric alcohol, hydrochloric acid and cyanogen and recovering said di-ester, the improvement which comprises incorporating at least one mol but not more than three mols of water per mol of cyanogen into the reaction medium whereby said di-ester is recovered in good yield and purity.

2. The process of claim 1 in which the water added is present in an amount equal to about two mols of water per mol of cyanogen.

3. The process of claim 1 which comprises conducting the reaction at temperatures of from 35° C. to about 75° C.

4. The process of claim 1 in which the aliphatic monohydric alcohol is ethyl alcohol.

5. The process of claim 1 in which the aliphatic monohydric alcohol is allyl alcohol.

References Cited in the file of this patent

UNITED STATES PATENTS

| | | |
|---|---|---|
| 1,194,354 | Bucher | Aug. 15, 1916 |
| 2,921,088 | Gasson et al. | Jan. 12, 1960 |

OTHER REFERENCES

Wertheim: "Organic Chem.," 3rd edition, McGraw-Hill Book Co., Inc., 1951, page 286 relied on.

Volhard: "Justus Liebigs Annalen Der Chemie and Pharmacie," vol. 158 (1871), pp. 118–122 relied on.

Lowy et al.: "Introduction to Organic Chemistry," 6th edition, Wiley & Sons, Inc., 1945, page 68 relied on.